Feb. 18, 1936. R. HARDING, JR 2,030,919
DEVICE FOR CREATING AN ILLUSION
Original Filed Dec. 4, 1931 3 Sheets-Sheet 1

INVENTOR
ROBERT HARDING JR.
BY
Chester A Bracelen
ATTORNEY

Feb. 18, 1936.   R. HARDING, JR   2,030,919
DEVICE FOR CREATING AN ILLUSION
Original Filed Dec. 4, 1931   3 Sheets-Sheet 2
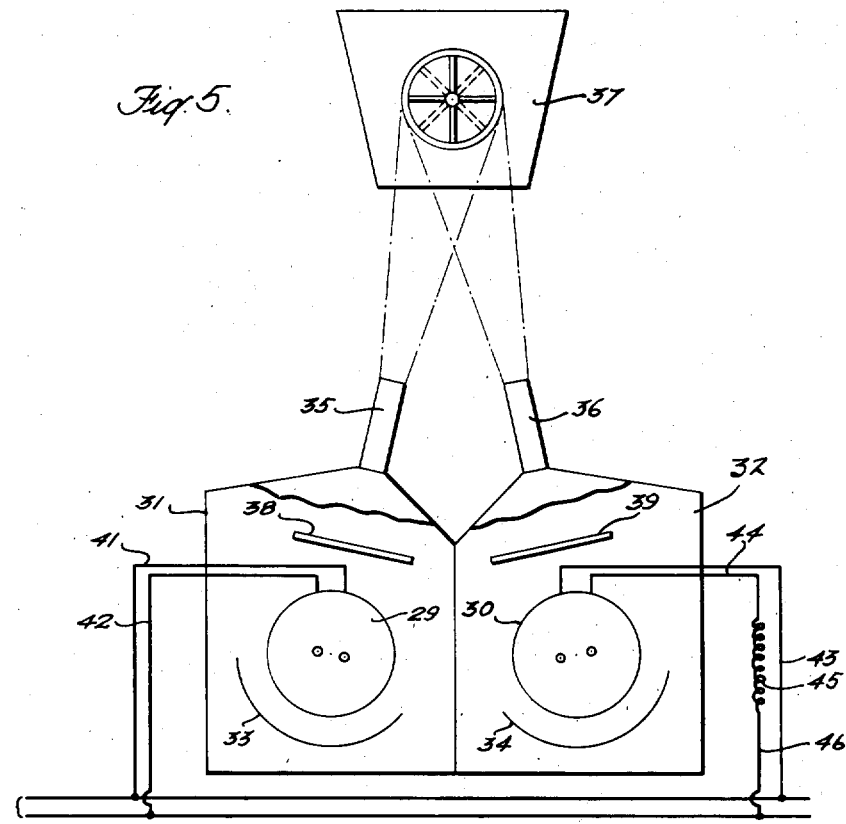
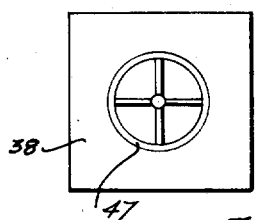
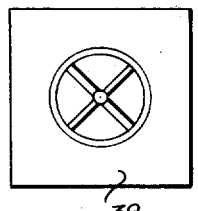
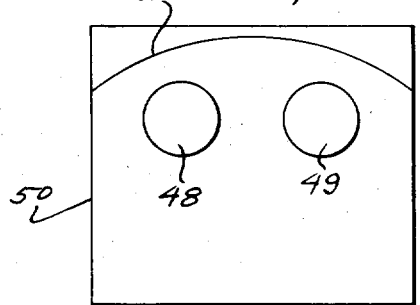
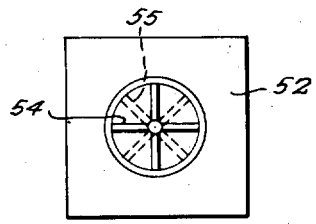
INVENTOR
ROBERT HARDING JR.
BY
Chester N Bravellart
ATTORNEY Feb. 18, 1936.   R. HARDING, JR   2,030,919
DEVICE FOR CREATING AN ILLUSION
Original Filed Dec. 4, 1931   3 Sheets-Sheet 3

INVENTOR
ROBERT HARDING JR.
BY
ATTORNEY

Patented Feb. 18, 1936

2,030,919

UNITED STATES PATENT OFFICE 2,030,919

DEVICE FOR CREATING AN ILLUSION

Robert Harding, Jr., Elmsford, N. Y., assignor to Sirian Lamp Company, Newark, N. J., a corporation of Delaware Application December 4, 1931, Serial No. 578,978
Renewed July 9, 1935

3 Claims. (Cl. 88—24)

This invention relates to display devices and especially to such devices adapted to create the illusion of motion or to give stereoscopic effects.

One of the objects of the invention is to provide a device for producing such effects without moving parts.

Another object of the invention is to provide a device for creating illusional effects as of motion or stereoscopic effects which has a plurality of light sources with means to cause each source to flash intermittently and out of phase with another source.

Another object of the invention is to produce various illusions of motion with the aid of colors.

Other objects of the invention and objects relating particularly to the construction and assembly of the various parts will be apparent as the description of the invention proceeds.

The invention has been illustrated in the accompanying drawings in which Fig. 1 is a front elevational view of a lamp which may be used with the device;

Figs. 2, 3, and 4 are enlarged fragmentary views of several embodiments of the electron emitting element shown in Fig. 1;

Fig. 5 is a diagrammatical view of the device with a wiring diagram included;

Fig. 6 is a front view of the two screens used in the apparatus of Fig. 5;

Fig. 7 is a diagrammatical view of a modified form of the invention;

Fig. 8 is a front view of the screen used in Fig. 7; and

In the application of Chester H. Braselton entitled Electrical discharge device, filed June 3, 1930, Serial No. 459,048, a lighting device is shown and described which comprises a filamentary wire which is rendered electron emitting in the presence of an inert gas having a certain pressure which may vary with the voltage used and the effect desired. The heating of the filament appears to cause ionization of the gas in the immediate vicinity of the filament rendering it conductive and forming a halo of lighted gas around the filament which gives off an intense illumination. The halo thus formed is responsive to variations of voltage and follows the alternating cycle, collapsing and expanding again as the direction of the voltage changes. The halo may also be made to expand at will by providing a conductor in the vicinity thereof and having a variable potential. When the potential is made negative the halo collapses while if it is increased in potential towards the positive side the halo will be caused to expand. This forms the subject matter of the application filed by Samuel Ruben entitled Apparatus for producing and modulating an ionic discharge, Serial No. 471,-977, filed July 31, 1930. The present invention intends to make use of these principles as will be hereinafter explained.

Figures 2, 3, 4:
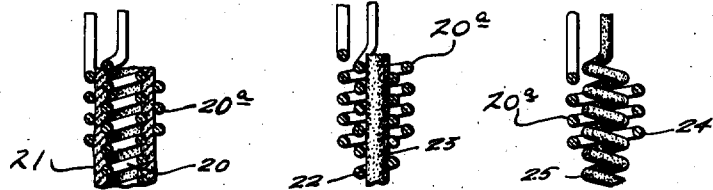

Referring now more specifically to the drawings the lamp as described in the first mentioned application above may comprise an envelope 10 which is formed integral with the usual press 11 for supporting the elements. A pair of electron emitting elements 12 and 13 may be supported at their lower ends respectively upon support rods 14 and 15 which are sealed in the press 11 and at their upper ends upon a cross connecting member 16 which may be welded or otherwise attached to an upright 17 which may extend down the center of the bulb and be sealed in the press 11 between the supports 14 and 15. Leading-in wires 18 and 19 may be connected respectively to the support rods 14 and 15 for making the electrical connections outside of the bulb and a suitable base (not shown) may be attached in the ordinary well known manner. The electron emitting elements 12 and 13 may each comprise a coil 20 of wire, preferably a refractory resistance wire such as tungsten, molybdenum, tantalum, nichrome, and may be coated as shown in Fig. 2 with electron emitting material 21 which may be any of the well known materials used for that purpose such as the oxides of the alkaline earth metals or mixtures of such oxides held together with a suitable binder. If desired the emitting material may contain a material which also has the property of selective radiation such as calcium oxide.

In Fig. 3 a modified form of the electron emitting element is shown in which the coil 22 has a core 23 of the electron emitting material extending down through the center and in contact with at least a portion thereof and in Fig. 4 a still further embodiment is shown wherein the coil 24 is coated with a thin layer of electron emitting material so that the individual turns are coated separately and are spaced apart from each other. Other forms of electron emitting elements may be used such as a filament wire with the material incorporated in the metal itself as the well known thoriated tungsten filament which may be made by treating tungstic acid and thorium nitrate and a straight uncoiled filament may, if desired, be used.

In order to carry the additional current which flows through the gas adjacent the filament when the filament is energized and thus protect the ends of the filament, the small coils 20a may be placed at each end of each of the elements and attached to the support rods. These coils may be made of wire capable of standing a high temperature about the same diameter as the wire of the filament coil. They should not be so large however as to cool the end of the filament too much but they should be large enough to carry the additional current. They may or may not be coated with the emitting material.

The envelope or bulb 10 may be filled with an inert gas which may preferably be one or more of the monatomic gases such as argon, neon, helium, krypton, or xenon, at a pressure in the neighborhood of 200 mm. of mercury depending on the voltage used and the desired size of the halo as greater pressures tend to cause the halo to be confined more closely to the filament. Also if desired to produce certain color effects as will be hereinafter described or increase the conductivity of the gas certain metal vapors, such as the vapors of mercury, caesium, calcium, rubidium, or cadmium may be used in small quantities mixed with the gas. These vapors may be introduced by providing a small container 26 having a pin hole 27 therein and supported by means of a wire 28 upon one of the support rods, as the rod 15. Inside of the container I provide a small piece of magnesium or calcium and a salt, such as a chloride, of the metal or metals whose vapor is desired to be placed in the bulb. After the bulb is sealed off the container 26 may be heated as by external bombardment which causes the magnesium or calcium to unite with the salt forming magnesium or calcium chloride and liberating the free metals which condense on the walls of the bulb to be vaporized again when the lamp is heated in use.

Figure 1:
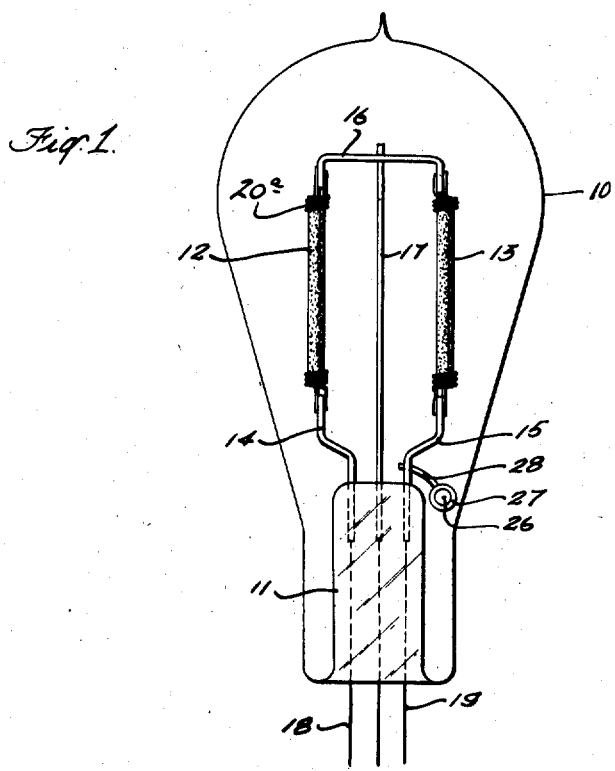

With the elements mounted as shown in Fig. 1 the envelope 10 may be connected to an exhaust pump in the usual manner and an oven placed over it to raise the temperature to between 350 to 400° C. or to as high a temperature as the glass will stand without deforming. A current may be run through the filament at this time to raise it to about 600° C. to drive out the occluded gases which may be present. When no more gas appears to be in the bulb as is evidenced by the lack of fluorescence when high tension current is directed against the walls of the bulb from an induction coil the current may be increased in the filament to raise it to about 800° C. to drive out the binder from the electron emitting material. When no more gas again appears to be in the bulb the current may be still further increased to about 1200° C. for a moment, the pump being connected all this time to remove all the gases driven off. Then the oven may be raised, the filament current turned off, the pump disconnected, and a slight amount of an inert gas such as neon at about ½ mm. pressure may be admitted to the bulb and the filament current turned on again and gradually increased. Spots of localized discharge will then appear having a reddish color. These spots gradually spread until a diffused glow completely fills the bulb which appears to activate the electron emitting coating and should be maintained until a uniform discharge is had throughout the bulb which should take less than ten minutes. During this time the current should not be raised too high on the filament so as not to throw off or destroy the coating.

If white discharge spots appear on the filament or support rods it is an indication that there are more gases or vapors within the bulb and the bulb should again be exhausted and the whole process of activation repeated.

When the activation is completed the filament temperature may be raised for a moment to about 1400° C. and then a vacuum pump again connected and the gas pumped out to remove any undesirable gases which may have been driven off during the activation process. When a high vacuum in the neighborhood of .5 micron is again obtained the filament current may be disconnected, the pump turned off, and about 50 mm. of neon gas followed with about 150 mm. of argon gas may be admitted to the bulb and the bulb sealed off.

If the metal vapors are desired in the bulb the container 26 may then be heated by external bombardment to flash the magnesium or calcium and in any case it may be preferable to have the magnesium or calcium in the container to clean up the gases after sealing off. The bulb is then ready for use.

In Fig. 5 the apparatus for producing the illusion is shown diagrammatically. Here the lamps 29 and 30 corresponding to what has just been described are mounted in two projection boxes 31 and 32 respectively provided respectively with reflectors 33 and 34 and optical systems 35 and 36 for throwing an image upon a screen 37. A transparent plate 38 having an object thereon is placed between the lamp 29 and the optical system 35 so that the image of the object on the plate 38 is thrown upon the screen 37. Also a transparent plate 39 carrying an object is positioned between the lamp 30 and the optical system 36 to throw the image of the object on the plate 39 upon the screen 37.

The lamp 29 may be connected directly across a lighting circuit 40 by means of wires 41 and 42 while the lamp 30 may be connected to one side of the lighting circuit by means of a wire 43, the other side being connected by means of a wire 44 to an inductance 45 which is in turn connected by means of a wire 46 to the other side of the lighting circuit. The inductance 45 is made of such a value that the voltage of the lamp 30 will be out of phase with the voltage of the lamp 29 so that the lamps will flicker alternately.

For purposes of illustration I have shown the two plates 38 and 39 in Fig. 6 having the image of a wheel 47 thereon. The plate 38 shows the wheel with the spokes in vertical and horizontal planes while the plate 39 shows the spokes in planes at an angle to the horizontal and vertical. The projection devices 31 and 32 are so arranged at an angle that the two images of the wheel 47 on both plates 38 and 39 are superimposed on the screen 37 and inasmuch as the two lamps 29 and 30 produce light alternately the picture of the wheel 47 on the plate 38 will be alternated with a picture of the wheel on the plate 39 and inasmuch as the wheel on the plate 39 is rotated slightly with respect to the wheel on the plate 38 the effect of the alternation will cause an appearance of rotation of the wheel.

As stated above the introduction of metal vapors in the bulb will produce colored effects. Thus a red light may be produced with a relatively large amount of neon gas with a trace of rubidium vapor, while a yellow light may be produced with a relatively large amount of neon gas and mercury and caesium vapor. A blue light may be provided with argon gas and a small amount of mercury vapor and a small amount of rubidium vapor while mercury vapor with argon gas will produce the lower wave length light as the violet.

The apparatus illustrated in Figs. 7 and 8 is adapted to make use of two lamp bulbs 48 and 49 each producing light of a different color as for instance the lamp 48 giving a red light while the lamp 49 gives a yellow light. These two lamps are placed in a housing 50 provided with a suitable reflector 51, and a transparent plate 52 is positioned in front of them. The plate 52 may have an object printed thereupon, as the wheel 53. If the spokes 54 of the wheel which are shown in solid lines are colored red and the spokes 55 which are shown in dotted lines are colored yellow the red spokes will appear when the yellow light is lit and the yellow spokes will become apparent when the red light is lit therefore giving the same effect as the apparatus of Figs. 5 and 6 but the image is on a single plate 52 which is viewed by the observer. Various colors of course may be used and any desired color effect may be obtained in this manner.

Figure 9:
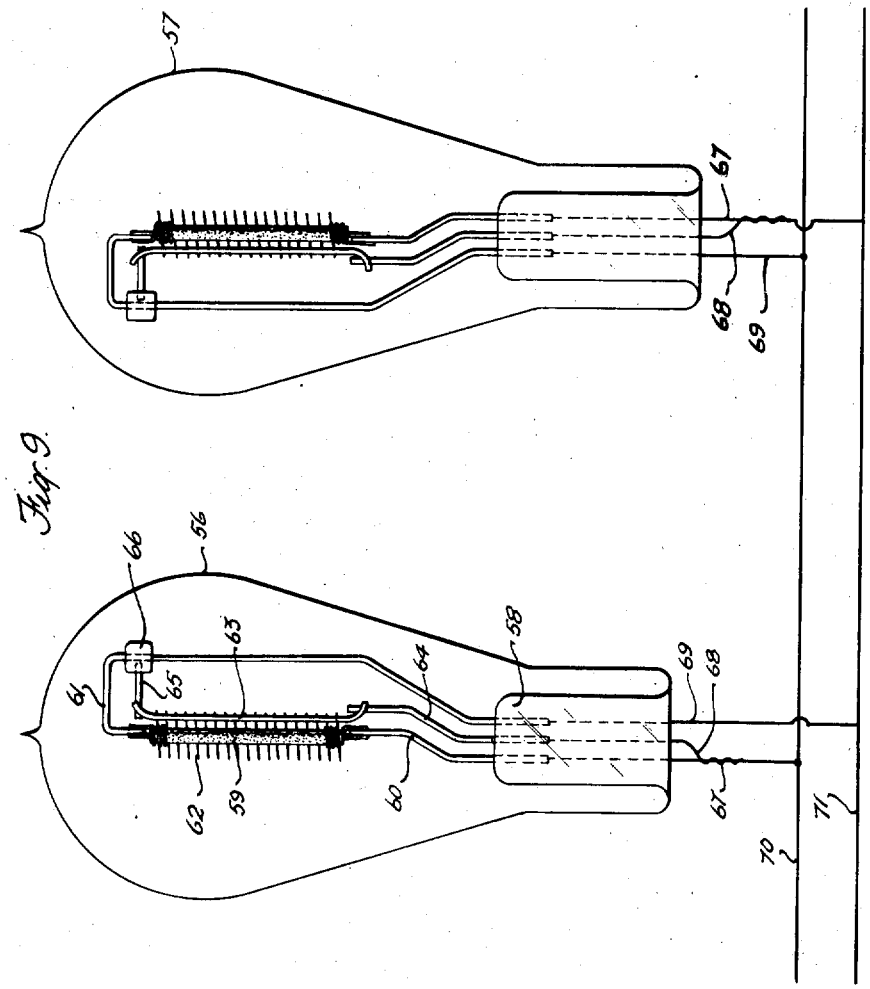
Fig. 9 is a plan view of two lamps which may be used in another embodiment of the invention showing the manner of connecting the lamps in the circuit.

Another embodiment of the invention is illustrated in Fig. 9 in which the principles described in the Ruben application above referred to are used. The two bulbs 56 and 57 of this figure are exactly alike and hence only one will be described. The bulb 36 comprises the usual envelope sealed onto a press 58 for supporting the elements. A single electron emitting element 59 is shown supported at its lower end upon a support rod 60 which is sealed in the press and at its upper end upon a support rod 61 which extends rearwardly and is bent downwardly to be also sealed in the press 58. A helical grid 62 surounds the element 59 and may be supported upon a wire rod 63 which may be supported at its lower end upon a support rod 64 sealed in the press and at its upper end upon a support rod 65 which may be sealed in a glass bead 66 mounted on the support rod 61 and supporting the grid out of contact with the element 59. Leading-in wires 67, 68, and 69 may be connected respectively to the support rods 60, 64, and 61. The leading-in wire 67 may be connected to one side 70 of a lighting circuit while the leading-in wire 69 which is attached to the other end of the filament may be connected to the other side 71 of the circuit. The leading-in wire 68 may be connected as shown to the leading-in wire 67 thus connecting the grid 62 to the lower end of the element or to the side 70 of the lighting circuit. The lamp 57 may have its leading-in wire 67 connected to the side 71 of the lighting circuit while the opposite end of the filament may be connected to the side 70 of the circuit by the leading in wire 69, or just the reverse of the connections for the lamp 66.

Thus connected the two lamps 56 and 57 of Fig. 9 may be used with either of the devices shown in Figs. 5 and 7. In the latter case, of course, the lamps would be provided with different combinations of gases to vary the color effects thereof. When the grid 62 of one lamp is made negative the halo around the element tends to collapse and when it becomes positive the tendency is to increase the size of the halo. When the wire 70 is positive and the wire 71 is negative, which is the case for one cycle of the alternating current wave, the grid 62 of the lamp 57 will be negative with respect to the main portion of the filament 59 and hence the halo in that lamp tends to collapse while at the same instant the grid of the lamp 56 is positive with respect to the main portion of the filament and hence the halo tends to increase in that lamp. When the potential is reversed and the wire 70 becomes negative and the wire 71 positive the halo will be increased in the lamp 57 as the grid is more positive than the filament, while in the lamp 56 the halo is decreased because the grid is more negative than the filament. Thus in an ordinary alternating current cycle the lamps will be made to flicker, one lamp being lighted for one-half cycle and the other being lighted for the other half.

While I have illustrated the invention in connection with a picture of a wheel and shown how the wheel appears to rotate due to the operation of the lamp it is evident that other forms of motion may be simulated thus a flame, or smoke, or the movement of water may be made to appear very realistic. Also a stereoscopic effect may be obtained if desired by producing two images one taken from a slightly different angle than the other.

If desired the whole apparatus may be made very small so that it may be placed in a single housing including the screen 37 in Fig. 5 or in either case the apparatus may be made to project on a screen some distance away. In the case of Fig. 7 where this is desired separate projection systems should be used for each lamp 48 and 49 and the objects may be printed or otherwise placed upon the screen through which the lights are projected alternately.

Many other modifications may be resorted to without departing from the spirit of the invention and I do not desire to limit myself to what has been shown and described except as such limitations occur in the appended claims.

What I desire to claim and secure by Letters Patent is:

1. In a device of the class described a pair of electric lamps each comprising an envelope, a filamentary resistance wire within said envelope, electron emitting material in contact with said wire, and an inert gas having a pressure in the neighborhood of 200 mm. of mercury surrounding said wire, means to minimize the ionization of the gas around said filament when the current flows in one direction through the lamp, means to connect said lamps reversely to said circuit so that when the current flows in one direction the ionization of gas in one lamp is minimized while when the current flows in the other direction the ionization of gas in the other lamp is minimized, a pair of objects one adapted to receive the light from each of said lamps, a screen, and means to project said objects in superimposed position upon said screen.

2. In a device of the class described a plurality of electric lamps, each of said lamps comprising an envelope, a filamentary resistance wire within said envelope, electron emitting material in contact with said wire, an inert gas surrounding said wire and having a pressure in the neighborhood of 200 mm. of mercury, one of said lamps having a trace of a metal vapor within said envelope which will produce a certain color, the other of said lamps having another metal vapor in said envelope which will produce a different color, means to connect said lamps to an electric light circuit whereby said lamps alternately radiate light, a pair of stationary objects positioned to receive the light from each of said lamps, one of said objects being invisible in one light and the other being invisible in the other light, and means to project said objects upon a screen in superimposed relation.

3. In a device of the class described a pair of electric lamps each comprising an envelope, a filamentary resistance wire within said envelope, electron emitting material in contact with said wire, and an inert gas surrounding said wire, means to minimize the ionization of the gas around said filament when the current flows in one direction through the lamp, means to connect said lamps reversely to said circuit so that when the current flows in one direction the ionization of gas in one lamp is minimized while when the current flows in the other direction the ionization of gas in the other lamp is minimized, a pair of objects one adapted to receive the light from each of said lamps, a screen, and means to project the images of said objects in superimposed position upon said screen.

ROBERT HARDING, Jr.